UNITED STATES PATENT OFFICE.

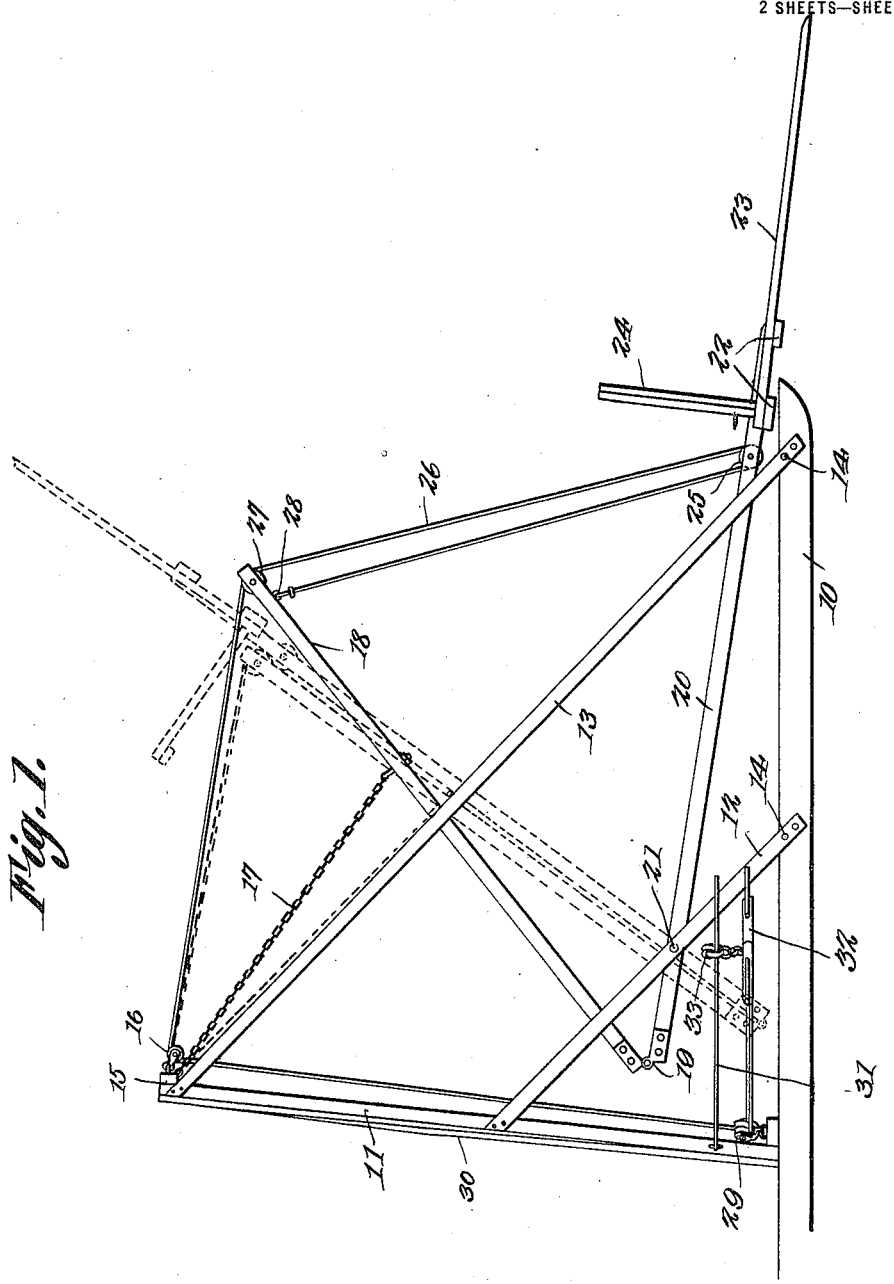

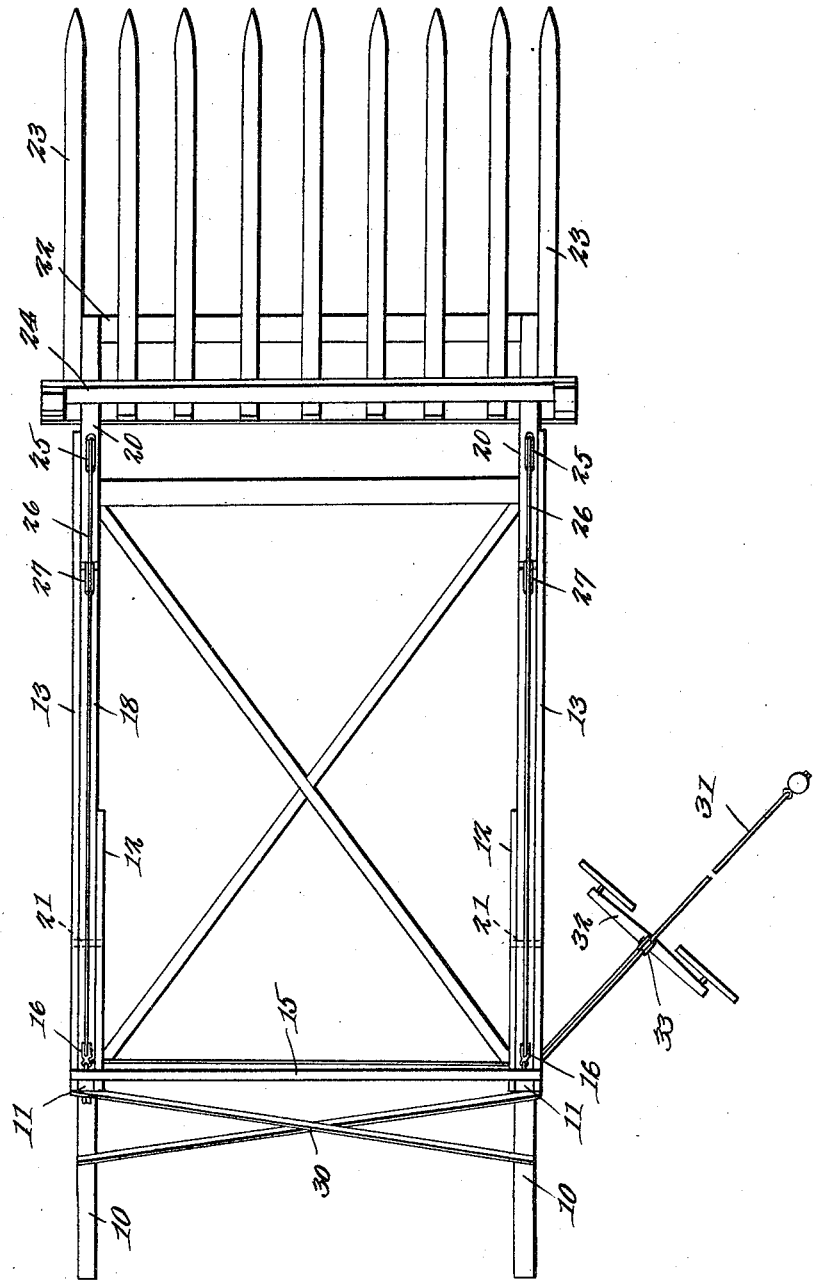

IRA S. LEGGITT, OF HALLOCK, MINNESOTA.

HAY-STACKER.

1,311,451.  Specification of Letters Patent.  Patented July 29, 1919.

Application filed February 6, 1918. Serial No. 215,615.

*To all whom it may concern:*

Be it known that I, IRA S. LEGGITT, a citizen of the United States, and resident of Hallock, in the county of Kittson and State of Minnesota, have invented certain new and useful Improvements in Hay-Stackers, of which the following is a specification.

This invention relates to agricultural implements and particularly to hay stackers.

An object of this invention is to provide novel means for mounting a carrier whereby increased leverage is afforded through the operating mechanism, so that a minimum of power is required to actuate the carrier and lift the load.

A further object of this invention is to provide a frame having a carrier pivotally connected thereto and a carrier operating mechanism pivotally connected to the carrier with means for actuating the operating mechanism, the relation of parts being such that the carrier and operating mechanism can be nested or folded so that the carrier will travel rearwardly to deposit the hay or straw or other vegetation which is to be stacked well back of the stacker, the said device having a novel arrangement of parts whereby the utility of the operating mechanism is not impaired by reason of the proximity of the vegetation to the stacker, even though in certain instances it touches it.

A still further object of the invention is to provide a combined shoulder and platform for carrying the vegetation and at the same time affording a support for an operator who may be raised to an elevated position while topping the stack.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a side elevation of a hay stacker embodying my invention;

Fig. 2 illustrates a plan view.

In these drawings 10 denotes a sled or runner portion of the hay gatherer and stacker, 11 an upwardly extending but slightly inwardly inclined frame section supported on the runners and held rigidly thereon by suitable means, such as braces 12 and 13 extending from the runners of the sled to the said uprights and secured thereto by fastenings such as 14.

The framelike structure has a cross beam 15 near the top to which pulleys 16 are connected and the said beam also constitutes an anchorage for the flexible members 17, here shown in the form of chains which are operative to limit the outward swinging motion of the supporting arms 18, one of which is provided on each side of the stacker and each of which has a hinge 19 by which it is pivotally connected to a fork arm 20, each of said fork arms being connected to a brace 12 by means of the pivot 21. The outer ends of the fork arms are connected by cross strips 22 to which the fork tangs 23 are attached and a combined guard and platform 24 extends upwardly from the cross strips 22 and serve to limit the rearward movement of the vegetation with respect to the fork and also constitutes a platform for supporting an operator who may be elevated to the top of a stack for topping the stack or for other purposes.

A pulley 25 is rotatably mounted in each arm 20 and each is intended to engage a rope or cable 26 which operates over a pulley 27 mounted on a supporting arm and over a pulley 16. Each flexible member 26 has one end anchored to the supporting arm as at 28 and each of the said flexible members also operates over a pulley 29 at the bottom of the frame so that when the flexible member is pulled, the fork arms will be oscillated on the pivots and elevated until they contact with the supporting arms 18, meanwhile the supporting arms have certain movement owing to the hinged connection between the said supporting arms and fork arms, it being understood that the said supporting arms will exert pressure on the inner ends of the fork arms thus pressing down back of the pivots 21 while the flexible members are elevating or lifting on the forward ends of the fork arms, an arrangement of parts which increases the effect of the force or pull applied for operating the flexible members according to the length of the arm 20 back of the pivots.

The outward movement of the supporting arms is limited, of course, by the chains or like flexible devices and after the parts have assumed the positions shown in dotted lines in Fig. 1, further pull on the flexible connections will cause the fork arms and supporting arms to travel together until they assume practically a vertical position when the vegetation will be dislodged from the fork.

It is understood that the fork arms, supporting arms, and parts associated therewith are duplicated on each side of the machine, and, therefore the parts shown in Fig. 11 will enable one skilled in the art to understand the construction of the device and the arrangement of like parts on the opposite side of said machine.

It will be seen from an inspection of the drawing that the pulleys and operating mechanisms are arranged on the side of the frame away from the stack so that vegetation can come close to the stacker without interfering with the operation of the stacking mechanism and the frame is held rigid by braces 30 which are suitably anchored for lending strength and durability to the structure.

A wire cable or other flexible device 31 is attached to the upright at the draft side of the stacker and at a point two or three feet from the bottom of the upright frame and it is then extended to an anchorage such as a stake which may be driven solidly in the ground at a distance of thirty or forty feet, as may be required by the load lifted. The purpose of the wire or anchorage is two fold, first by having the same between the horses constituting the draft team, it serves as a guide to direct the movement of the team both forward and back and thus dispenses with the driver entirely except in the case of the use of very spirited or fractious team, and secondly, it serves as a cable on which the whiffle trees 32 may be carried by means of a small pulley 33, thus preventing said whiffle trees or rigging from striking the heels of the team.

I claim—

In a hay stacker, a frame, fork arms pivotally connected to the frame intermediate their lengths, a fork carried by the arms, supporting arms, means for pivotally connecting the supporting arms to the fork arms to the rear of the pivots of the fork arms, pulleys on the fork arms adjacent the fork, pulleys on the supporting arms adjacent the outer ends thereof, vertically extending braces forming a part of the frame and having pulleys disposed adjacent their upper extremities, flexible members having one of their ends connected to the respective supporting arms adjacent the outer ends thereof, said flexible members passing over the pulleys of the fork arms and over the pulleys of the supporting arms to the pulleys of the braces, to exert a pressure on the extreme ends of the fork arms through the supporting arms when the flexible members are operated.

IRA S. LEGGITT.

Copies of this patent may be obtained for five cents each, by addressing the "Commissioner of Patents, Washington, D. C."